UNITED STATES PATENT OFFICE.

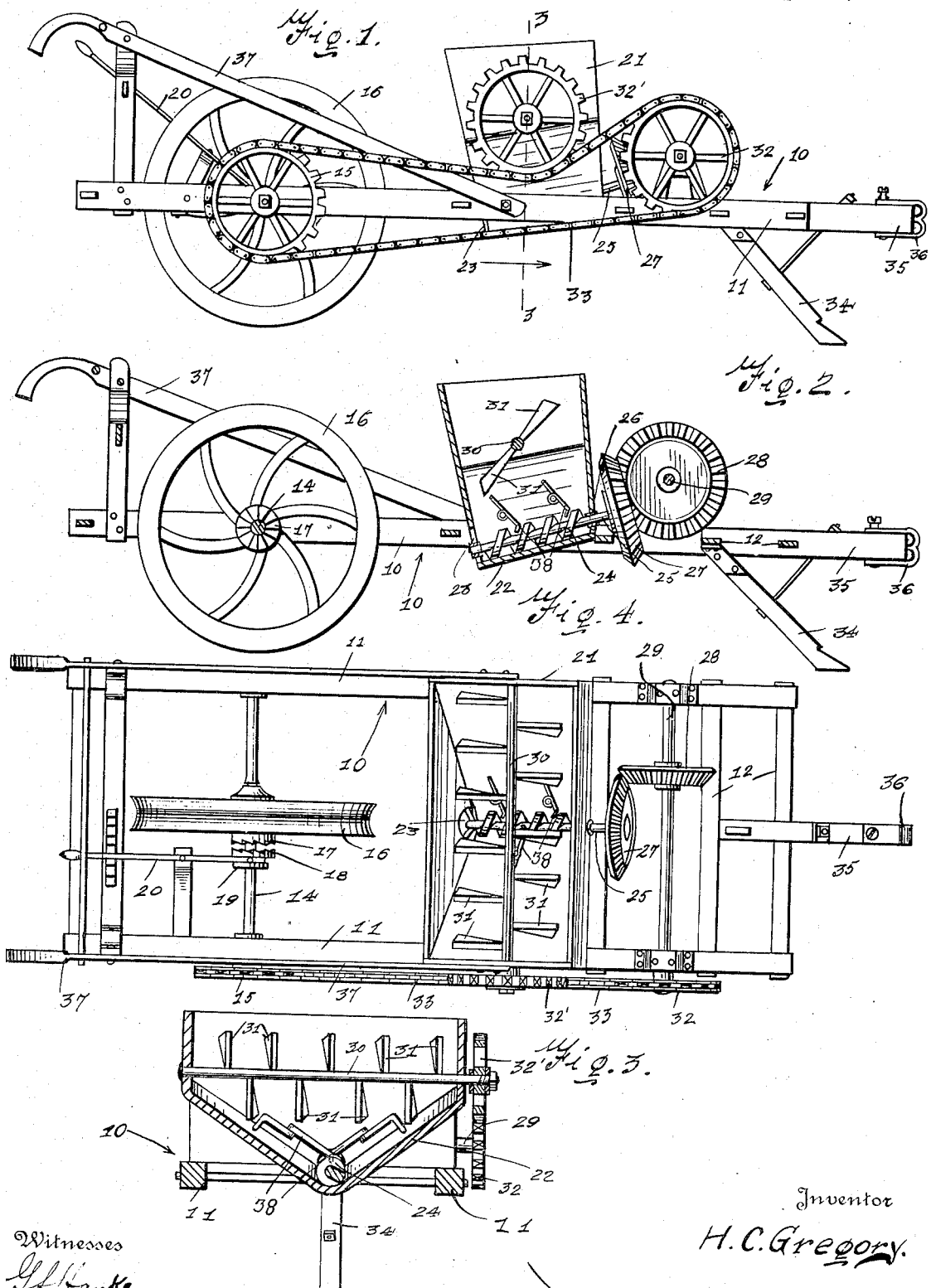

HULET C. GREGORY, OF CENTER, MISSISSIPPI, ASSIGNOR OF ONE-HALF TO JOHN A. DAVIS, OF KOSCIUSKO, MISSISSIPPI.

FERTILIZER-DISTRIBUTER.

1,280,103.  Specification of Letters Patent.  Patented Sept. 24, 1918.

Application filed November 2, 1914. Serial No. 869,946.

*To all whom it may concern:*

Be it known that I, HULET C. GREGORY, a citizen of the United States, residing at Center, in the county of Attala, State of Mississippi, have invented certain new and useful Improvements in Fertilizer-Distributers; and I do hereby declare the following to be a full, clear, and exact description of the invention, such as will enable others skilled in the art to which it appertains to make and use the same.

This invention relates to fertilizer distributers and has for one of its objects to improve and simplify the construction of machines of this character.

A further object of the invention resides in the provision of a novel form of feed mechanism whereby a uniform quantity of fertilizer will be discharged from the hopper, means being provided for preventing clogging of the hopper.

With the above and other objects of similar nature in view, the invention resides in the combination, formation and arrangement of parts set forth in and falling within the scope of the appended claim.

In the drawing:

Figure 1 is a side elevation of a fertilizer distributer constructed in accordance with my invention, Fig. 2 is a longitudinal sectional view therethrough, Fig. 3 is a transverse sectional view on line 3—3 of Fig. 1 and Fig. 4 is a plan view of the machine.

Referring now more particularly to the drawing, the distributer comprises a substantial rectangular frame 10, including parallel bars 11 and cross braces 12, and has journaled in suitable bearings arranged adjacent the rear ends of said side bars, a transverse shaft 14, one end of said shaft extending beyond its journal and having fixed thereon a sprocket wheel 15. Loosely mounted on the shaft 14 is a traction wheel 16 having formed on the hub thereof a clutch face 17 with which is adapted to mesh a clutch face 18 formed on a collar 19 that is slidably keyed to the shaft, said clutch being thrown into and out of mesh by means of a hand lever 20 carried by the frame.

Supported intermediate the frame 10 is a hopper 21, the bottom 22 of which slants downwardly toward the rear of the machine and is provided at its lower end with a discharge opening 23 disposed in alinement with the traction wheel. Mounted for rotation in the bottom of the hopper and likewise disposed on a slant rearwardly of the machine is a feed worm 24, said worm being carried by a shaft 25 that is journaled in bearings 26 arranged in the end walls of the hopper, the forward end of the shaft extending outwardly of the hopper and having fixed thereon a beveled gear 27. Meshing with this bevel gear is a second bevel gear 28 that is keyed to a shaft 29 journaled, transversely of the frame.

There is also mounted for rotation in the hopper a transverse shaft 30 having arranged thereon a plurality of agitator fingers 31 adapted to keep the contents of the hopper in motion and direct same toward the feed worm 24.

It will be noted that corresponding ends of the shafts 29 and 30 extend outwardly from the journals and have keyed thereon sprockets 32 and 32'. Trained about the sprockets 14 and 32 and under the sprocket 32' is a chain 33 whereby power is transmitted from the traction wheel 16 to actuate the feed worm and agitator 31.

There is also arranged on the frame 10 forwardly of the hopper a furrow opener 34, the same being disposed in longitudinal alinement with the opening 23. Extending forwardly from the frame is a draft tongue 35 at the end of which is a clevis 36, handles 37 being supported at the rear of said frame whereby the machine may be conveniently steered.

In operation, the hopper 21 is filled and the machine moved along the ground and the traction wheel 16 thrown into gear by means of the lever 20. Power is thus transmitted to the feed worm and agitator in the manner above-described and the contents of the hopper forced rearwardly through the discharge opening 23 and into the furrow made by the opener 33, the traction wheel 16 following said furrow and serving to close same and roll the ground.

There is further provided in the bottom of the hopper 21 a plurality of spring cleaners 38 the free ends of which are adapted to engage the feed worm 24 whereby to prevent accumulation of fertilizer on the blades thereof.

What is claimed is:

In a fertilizer distributer, hopper having a rearwardly and downwardly inclined bottom and an outlet opening adjacent to said bottom, a feed screw mounted within the hopper contiguous to the bottom, means for driving the feed screw, a plurality of resilient cleaners in the form of blades meshing with the threads of the feed screw for cleaning said thread on the rotation of the screw, and an agitator means located within the hopper above the feed screw.

In testimony whereof I affix my signature in the presence of two witnesses.

HULET C. GREGORY.

Witnesses:
G. H. WALLACE,
J. H. CAINE.